United States Patent [19]

Schaefer

[11] Patent Number: 5,453,670
[45] Date of Patent: Sep. 26, 1995

[54] METHOD OF CONTROLLING A WINDSHIELD WIPER SYSTEM

[76] Inventor: Eric G. Schaefer, 21121 Parker, Farmington Hills, Mich. 48336

[21] Appl. No.: 176,797

[22] Filed: Jan. 3, 1994

[51] Int. Cl.$^6$ .................................................. B60S 1/08
[52] U.S. Cl. ................................. 318/444; 318/DIG. 2; 388/907.5; 388/916
[58] Field of Search ................................... 318/443, 444, 318/480, 483, DIG. 2; 388/900, 901, 907.5, 909, 910, 916, 921, 933; 15/250.12, 250.13, 250.17

[56] References Cited

U.S. PATENT DOCUMENTS

| Re. 33,308 | 8/1990 | Millerd et al. | 318/444 |
|---|---|---|---|
| 4,131,834 | 12/1978 | Blaszkowski | 318/483 |
| 4,317,073 | 2/1982 | Blaszkowski | 318/483 |
| 4,463,294 | 7/1984 | Gibson | 318/313 |
| 4,476,419 | 10/1984 | Fukatsu et al. | |
| 4,542,325 | 9/1985 | Kobayashi et al. | |
| 4,588,935 | 5/1986 | Kaneiwa et al. | |
| 4,689,536 | 8/1987 | Iyoda | 318/483 |
| 4,705,998 | 11/1987 | Millerd et al. | 318/444 |
| 4,720,664 | 1/1988 | Iwamoto et al. | 318/444 |
| 4,740,735 | 4/1988 | Hayashi | 318/483 |
| 4,916,374 | 4/1990 | Schierbeek et al. | 318/483 |
| 4,987,354 | 1/1991 | Steinmann | |
| 5,059,877 | 10/1991 | Teder | 318/444 |
| 5,117,168 | 5/1992 | Nomura et al. | |
| 5,140,234 | 8/1992 | Wallrafen | |
| 5,216,341 | 6/1993 | Nomura et al. | 318/444 |
| 5,239,244 | 8/1993 | Teder | 318/444 |

*Primary Examiner*—Bentsu Ro
*Attorney, Agent, or Firm*—Brooks & Kushman

[57] ABSTRACT

A method of automatically controlling the operating speed of a vehicular windshield wiping system based on an average rate of change in the value of a sensor signal indicative of the moisture on the windshield. The wiping system includes a motor for driving at least one wiper blade at a high speed and a low speed, and a sensor mounted to the windshield for monitoring a portion of the windshield wiped by the at least one wiper blade. The method includes determining an average rate of change in the sensor signal value over a predetermined period of time and operating the wiper system with the motor at the high speed based on the average rate of change in the sensor signal value. In one embodiment, the method includes wiper system is operated with the motor at the high speed based on the frequency with which the average rate of change in the sensor signal value drops below a first predetermined threshold.

14 Claims, 16 Drawing Sheets

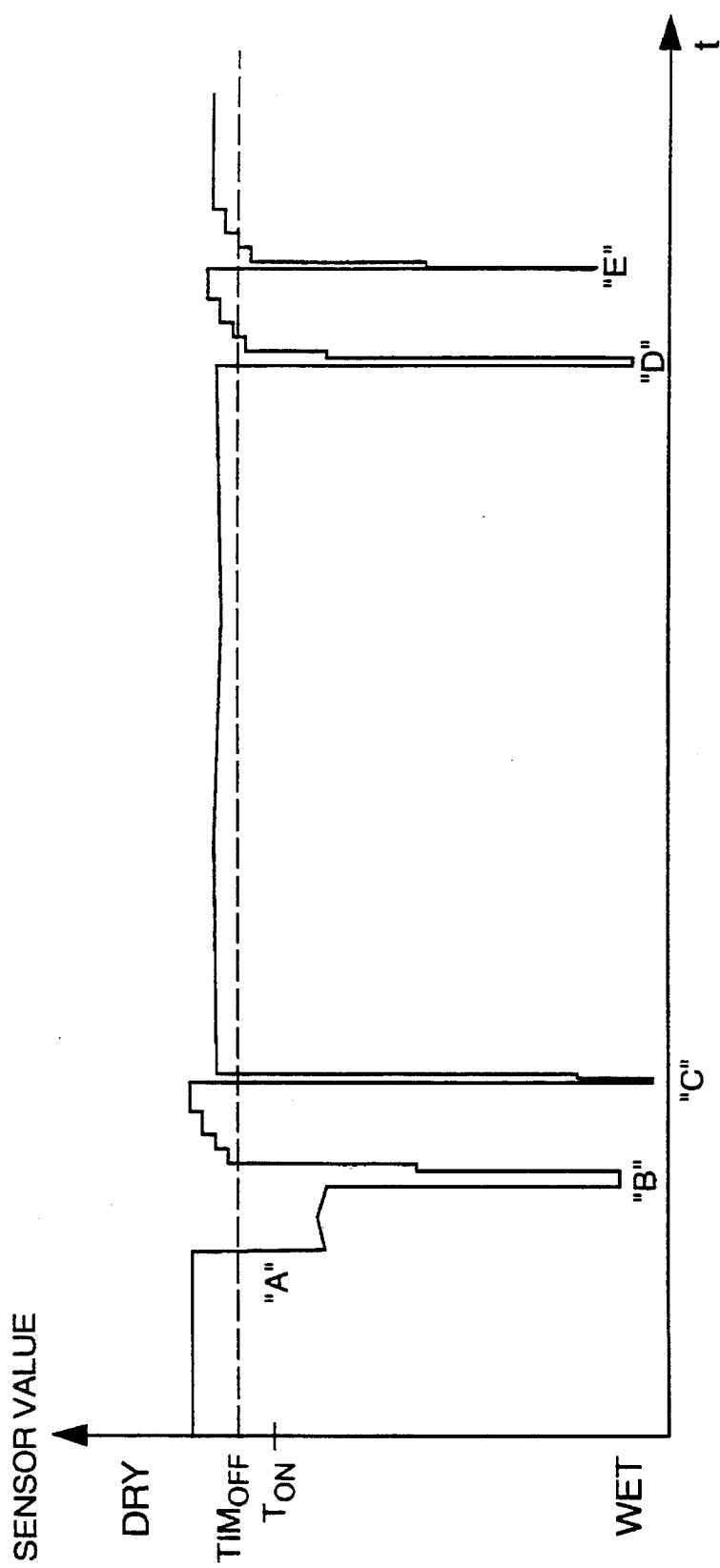
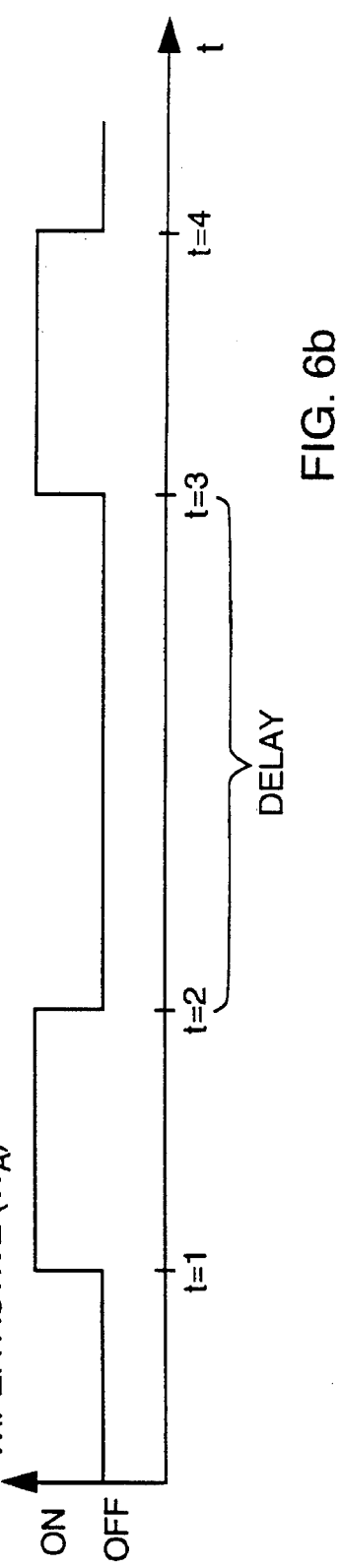
FIG. 6a
FIG. 6b

METHOD OF CONTROLLING A WINDSHIELD WIPER SYSTEM

TECHNICAL FIELD

The present invention relates to windshield wiper systems and, more particularly, to a method for automatically controlling the operating speed of a windshield wiper system.

BACKGROUND ART

Automatically controlled windshield wiping systems typically detect the presence of a liquid or a solid coating on the windshield of a vehicle. Depending on the type and quantity of coating present on the windshield, the wiper system is activated to clean the windshield, operating in either an intermittent mode, wherein a varying time delay is inserted between consecutive wipes, or a continuous mode, wherein there is no time delay between consecutive wipes.

Examples of such systems are disclosed in U.S. Pat. Nos. 4,689,536, issued to Iyoda, 4,705,998, issued to Millerd et al., 4,720,664, issued to Iwamoto et al., 4,740,735, issued to Hayashi, and 4,916,374, issued to Schierbeek et al.

SUMMARY OF THE INVENTION

It is an object of the present invention to provide an improved method of controlling a windshield wiping system.

It is a further object of the present invention to provide a method for accurately controlling the operating speed of a windshield wiping system.

In carrying out the above objects and other objects and features of the present invention, a method is provided for controlling the operating speed of a vehicular windshield wiping system including at least one wiper blade, a motor for driving the at least one wiper blade at a high speed and a low speed, and a sensor mounted to the windshield for monitoring a portion of the windshield wiped by the at least one wiper blade, the sensor generating a sensor signal having a value indicative of the moisture on the portion of the windshield, the system also including an electronic control unit for controlling the motor based on the sensor signal. The method comprises determining an average rate of change in the sensor signal value over a predetermined period of time, and operating the wiper system with the motor at the high speed based on the average rate of change in the sensor signal value.

In one preferred embodiment, the wiper system is operated with the motor at the high speed based on the frequency with which the average rate of change in the sensor signal value drops below a first predetermined threshold. The method also comprises determining a rolling sum of the number of times the average rate of change drops below a first threshold over a second predetermined period of time, comparing the rolling sum to a second predetermined threshold, and operating the wiper system with the motor at the high speed based on the comparison.

A system is also provided for carrying out the method.

The advantages accruing to the present invention are numerous. For example, the operating speed of the windshield wiping system is properly controlled during different rain patterns to operate in intermittent, continuous and high speed modes, thereby providing entirely automatic operation.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIGS. 6a and 6b is a graphical illustration of a typical sensor signal indicating a single drop rain patter;

BEST MODE FOR CARRYING OUT THE INVENTION

Figure 1:
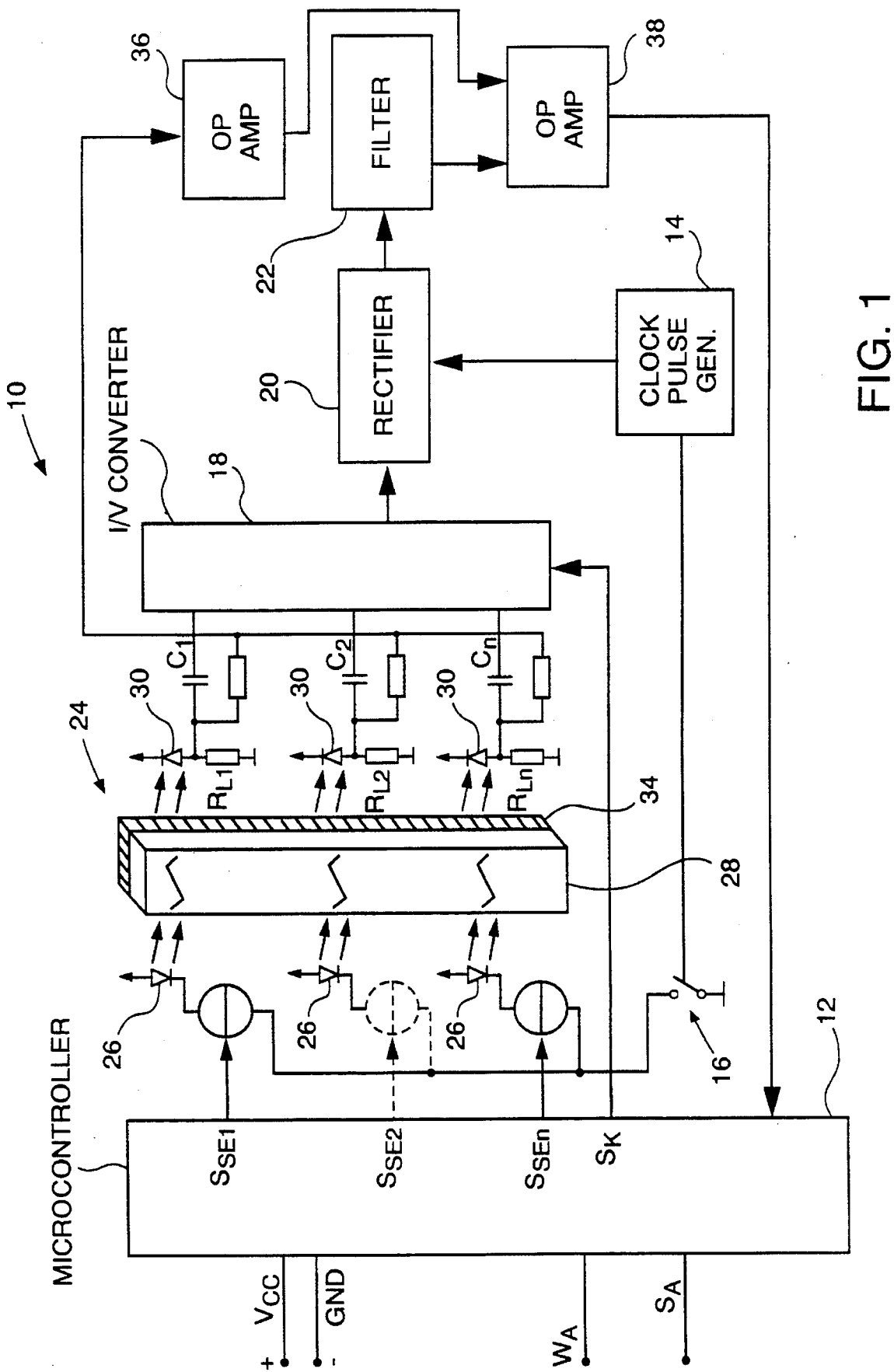
FIG. 1 is a block diagram of the electronic control unit of the windshield wiping system for carrying out the method of the present invention.

Referring now to FIG. 1, there is illustrated a block diagram of an apparatus, shown generally by reference numeral 10, for controlling a windshield wiping system. As illustrated, the apparatus preferably includes a microcontroller 12, a clock pulse or frequency generator 14 which cooperates with a switch 16, a current-to-voltage (I/V) converter 18, a phase-selective rectifier 20 and a filter 22. The apparatus 10 also preferably includes an optoelectronic assembly, shown generally by reference numeral 24, including a plurality of infrared beam transmitters 26, a beam guide element 28 including lenses and a plurality of infrared beam receivers 30 for evaluating conditions existing on the windshield 34. It should be appreciated that although the windshield wiping system is shown to be controlled by a microcontroller, the system could also be controlled by an analog and/or digital switching system, or the like.

The beam transmitters 26, the beam guide 28, the beam receivers 30 and the electronic componentry are formed as an optoelectronic sensor mounted on the inside surface of a vehicular windshield, not specifically illustrated. The surface area of the sensor defines an area of the windshield, referred to herein as the sensor active area, monitored by the sensor. The sensor is positioned such that a wiper blade passes over the sensor active area twice during each wipe cycle—once leaving the resting position and once returning to the resting position.

With continuing reference to FIG. 1, each infrared beam transmitter 26 on the one side (the input side) of the beam guide element 28 has an associated infrared beam receiver 30 on the opposite side (the output side) of the beam guide element. In the preferred embodiment, the infrared beam transmitters 26 are infrared light emitting diodes (LEDs), such as part number SFH485P, commercially available from Siemens Components, Inc., of Cupertino, California, United States of America. The beam receivers are preferably infrared photodiodes having a non-linear characteristic, such as part number SFH205, also commercially available from Siemens Components, Inc.

As shown in FIG. 1, the apparatus 10 also includes a pair of op amps 36 and 38 for processing signals from the beam receivers 30 and the filter 22, respectively. The microcontroller 12 processes the signal received from the op amp 38 and accordingly controls operation of the vehicular windshield wiping system including a motor, not specifically illustrated, which is mechanically coupled to the vehicle windshield wiper (s), via control output SA, and a control input WA (Wiper Active) as described in greater detail below.

The sensor device 10 is powered via electrical connections to a power supply, such as a vehicle battery, through the $V_{cc}$ and GND inputs. The transmitting current of the infrared beam transmitters 26 is set via the control outputs $S_{SEI}$ to $S_{SEN}$ of the microcontroller 12. In the preferred embodiment, the infrared beam transmitters 26 of the optoelectronic assembly 24 are energized with a pulse-width modulated voltage at a frequency of at least 2 kHz. This modulation gives rise to a signal originating from the transmitters 26 in the form of an alternating signal which, for evaluation of the conditions existing on the windshield 34, is supplied to the infrared beam receivers 30 via the beam guide 28 in a known manner. The light emitted by the infrared beam transmitters 26 is converted by the infrared beam receivers 30 and associated resistors into an electrical quantity representing a useful signal. Since the beam receivers 30 have a non-linear characteristic, the useful signal is non-linear when differing ambient light conditions prevail.

The useful signal thus produced is additionally dependent upon the ambient temperature, since the efficiency of the beam transmitters 26 and the beam receivers 30 is temperature-dependent. As a result, the useful signal is corrupted. To compensate for this temperature effect, the current sources for the beam transmitters are provided with temperature compensation. Alternatively, the microcontroller 12 can be provided with temperature information from at least one sensor not specifically illustrated which measures ambient temperature. This sensor can be a thermistor, or an integrated circuit which functions like a thermistor. The transmitting current of the beam transmitters 26 can then be adjusted by the microcontroller 12 based on the temperature information, such that the output quantity is independent of the ambient temperature.

With continuing reference to FIG. 1, the light emerging from the beam guide 28 includes interference light, in addition to the transmitted infrared light. This interference light includes infrared light fractions of ambient light, which are received by the beam receivers 30. As a result, the output from the beam receivers 30 includes an interference signal arising from and due to the infrared light fractions. Typically, this interference signal is superimposed on the signal generated by the infrared beam receivers 30 due to the infrared beam transmitters 26 and is therefore provided to the I/V converter 18.

Preferably, the voltage signal from the I/V converter 18 is processed by the phase selective rectifier 20, which cooperates with the frequency generator 14 to suppress glitch signals having a frequency which differs from that of the generator 14. Prior to processing by the I/V converter 18, the signals from the beam receivers 30 are capacitively decoupled utilizing capacitors C1–Cn. Together, the capacitors and the rectifier 20 function to remove the superimposed interference signal. The output of the rectifier 20 is provided to the filter 22, which preferably has a low-pass characteristic, functioning to smooth fluctuations in the voltage signal from the I/V converter 18 caused by rapid changes in ambient light. The output signal of the filter 22 is ultimately a measure of the coating, or degree of wetting, of the windshield. Some influences of the ambient light remain, however, having a disturbing effect upon the received signal.

With continued reference to FIG. 1, in addition to controlling the transmitting current of the infrared beam transmitters 26, the microcontroller 12 controls the conversion factor of the I/V converter 18 via the control output SK. By controlling the transmitting current and the conversion factor, the apparatus automatically adapts to widely differing measuring conditions, accurately controlling the windshield wiper system regardless of the type of windshield. This adaptation is desired because the damping factor of the optoelectronic assembly 24 is dependent upon the type of windshield utilized, such as clear glass, heat insulating glass without a band-stop filter, or heat insulating glass with a band-stop filter. As a result of adaptation, the apparatus is automatically switched into its optimum operating range.

In the preferred embodiment, the transmitting current control of the infrared beam transmitters 26 may be separately set to have a range of about 15 dB, i.e. 16 stages of about 1 dB for each of the beam transmitters. Also preferably, the conversion factor control of the I/V converter 18 may be set to have a range of about 50 dB, i.e. 6 stages each of about 10 dB. As a result, the apparatus 10 has available a continuous setting range of about 65 dB, in about 1 dB stages, for automatic adaptation. The setting values acquired are preferably stored in a non-volatile memory of the microcontroller 12 and are therefore available as starting values for each subsequent activation of the apparatus 10 without there being any need for renewed adaptation. As a result of overlapping of the setting ranges, component tolerances may also be compensated. To effect a sensitivity balance between the infrared beam transmitters 26 and the associated infrared beam receivers 30, the overlap region is further utilized in conjunction with the separate setting facilities of the beam transmitters 26, since only the total signal is converted by the I/V converter 14. This balance ensures that the sensitivity of each transmitter/receiver pair of the optoelectronic assembly 24 are substantially identical.

In particular, the ability to control the beam transmitting current and the conversion factor of the I/V converter 18 allows the apparatus to compensate for effects such as different windshield types, manufacturing tolerances and aging effects of the infrared beam transmitters 26 and the infrared beam receivers 30, tolerances in the trigger and evaluation electronics not specifically illustrated which cooperate with the apparatus 10, tolerances of the beam guide 28, and aging effects of the windshield (e.g. scratches from being hit by stones), to name a few.

One problem not adequately solved by the prior art relates to unwanted influences of the ambient light and continuous rapid changes in ambient light conditions, such as that which occur when driving along a tree-lined road (i.e. interplay of light and dark). The rapid changes can trigger the apparatus 10 into activating the windshield wiper system inadvertently.

To eliminate these unwanted ambient light influences, the present invention incorporates load resistors RL1, RL2, ... , RLn, as shown in FIG. 1. The voltage drop at the load resistors RL1, RL2, ... , RLn is preferably used as a correcting quantity for operation and control of the windshield wiping system. This correction is also preferably used, for example, to prevent the output voltage from sliding below an interference level of the apparatus, as a result of ambient light influences. In the preferred embodiment, the interference level represents a threshold beyond which in all probability signal changes are to be evaluated as a coating present on the windshield. As best shown in FIG. 1, the operational amplifier 36 is in electrical communication with the load resistors RL1, RL2, ... , RLn and processes the voltage drop at the load resistors into the correcting quantity, so as to linearize the useful signal. The output of the operational amplifier 36 is provided to the operational amplifier 38.

In addition to receiving the processed correcting quantity output from the operational amplifier 36, the operational amplifier 38 also receives the signal output from the filter 22 as an input quantity. In the preferred embodiment, the operational amplifier 38 eliminates the variations in the useful signal caused by the ambient light by injecting the correcting quantity, thereby resulting in the formation of a linearized output voltage supplied to the microcontroller 12. This linearized output voltage is the sensor signal utilized by the microcontroller to control the windshield wiping system. Influences upon the useful signal which originate from the ambient light are, therefore, effectively eliminated.

Figure 2:
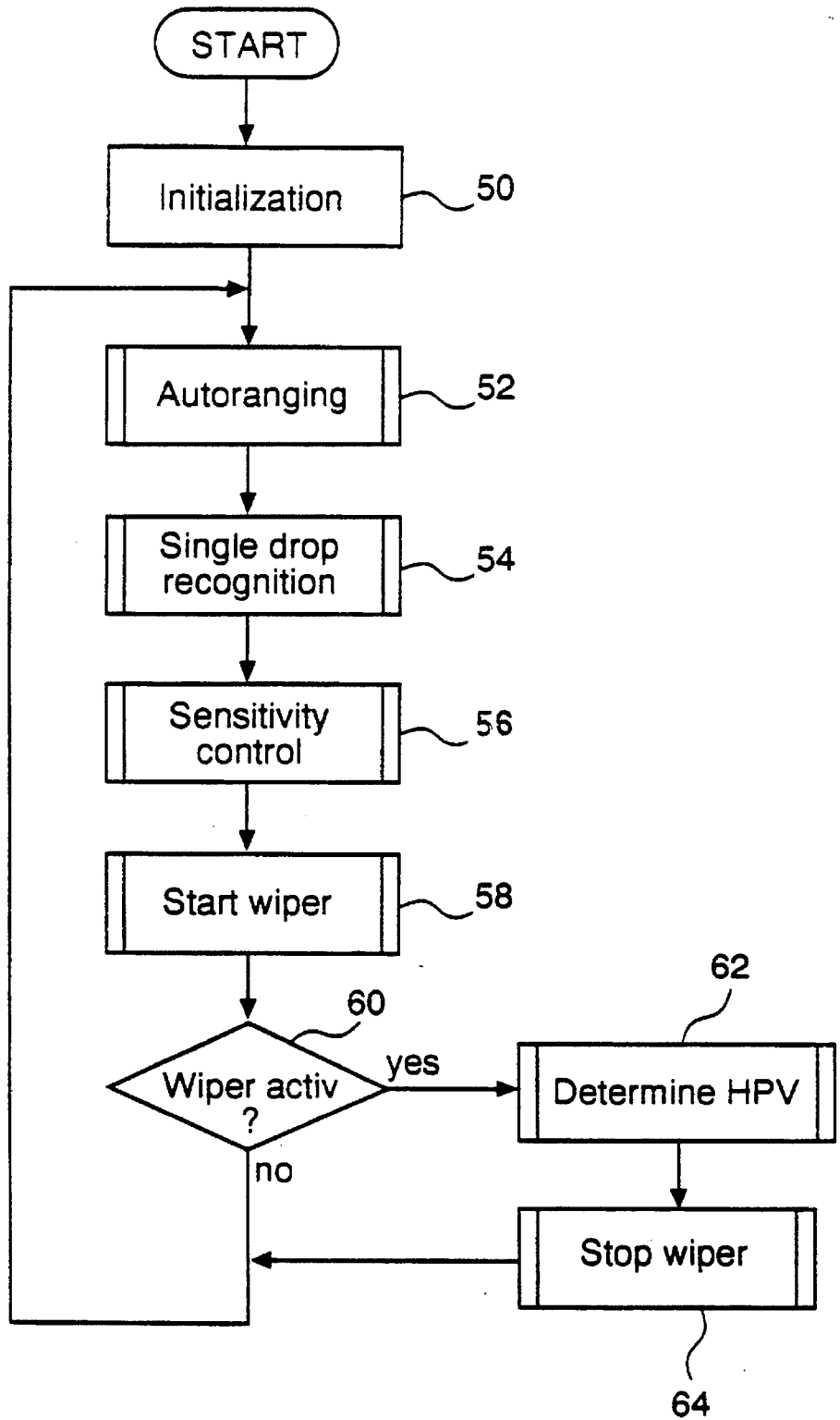
FIG. 2 is a flowchart illustrating the steps of the method of controlling a windshield wiping system.

Referring now to FIG. 2, there is shown a high level flow chart illustrating the control flow executed by the apparatus 10 in controlling the windshield wiping system according to the present invention. Wiping of the windshield is generally a function of a moisture ratio value (MRV), which is calculated from the current sensor value and the last determined hundred percent value (HPV), as described in greater detail below. With reference to FIG. 1, the sensor value is that signal provided to the microcontroller 12 from the operational amplifier 38. The HPV reflects the maximum sensor value for a "dry" windshield and may be different than the highest possible value measured with a clean windshield, since it is measured regardless of the amount of dirt, salt, and the like present on the exterior surface of the windshield. These elements tend to decrease the sensor value, but are distinguishable from moisture by use of the HPV.

Generally, the moisture ratio value is compared to two dynamic parameters, referred to herein as a connection, or switch-on, threshold ($T_{ON}$) and a disconnection, or switch-off, threshold ($T_{OFF}$), to determine whether the windshield wipers should be activated or deactivated. In the preferred embodiment, these thresholds are expressed as a percentage of the HPV and can be modified or overridden based on specific conditions, as explained below. When the moisture ratio falls below $T_{ON}$, the wipers are activated. When the moisture ratio is above $T_{OFF}$ after a complete wipe cycle, the wipers are deactivated. The windshield wipers can be activated and deactivated under certain additional conditions: if the sensor value is out of range, and if a special type of rain pattern is detected, as described in greater detail below. Additionally, the apparatus may initiate a wipe cycle during intermittent mode of operation when the time delay between wipes has exceeded a predetermined set time. This acts as a reminder to the vehicle operator that the windshield wiping system is being operated in the intermittent mode.

As best shown in FIG. 2, operation begins with initialization at step 50. During initialization, appropriate memory locations and flags are cleared, variables are set to predetermined values, output ports are reset to normal state, the gain for the I/V converter 18 shown in FIG. 1 is preset, and the like. At step 52, autoranging of amplification is performed by the microcontroller.

Figure 3:
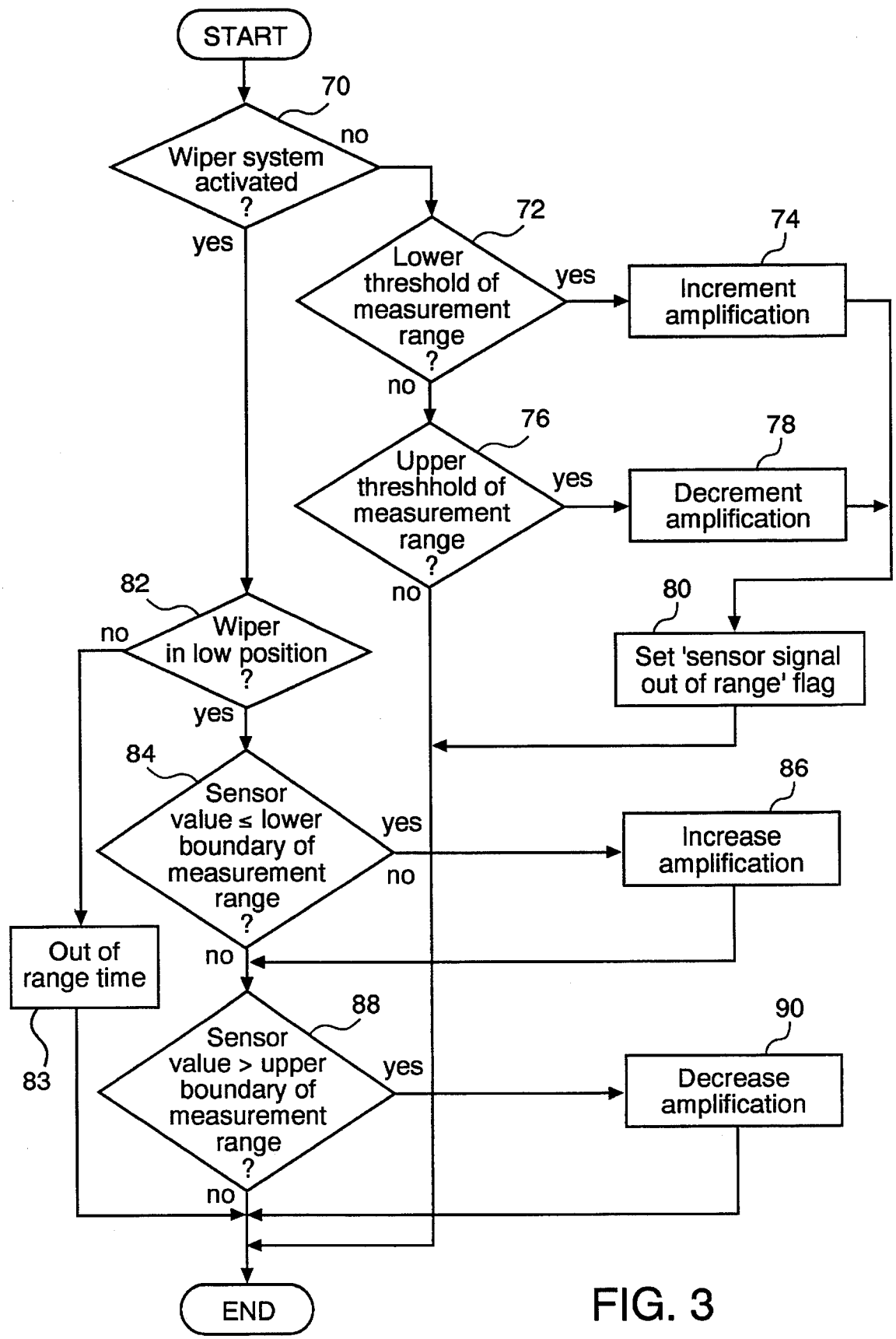
FIG. 3 is a flowchart detailing the autoranging step shown in FIG. 2.
Figure 4:
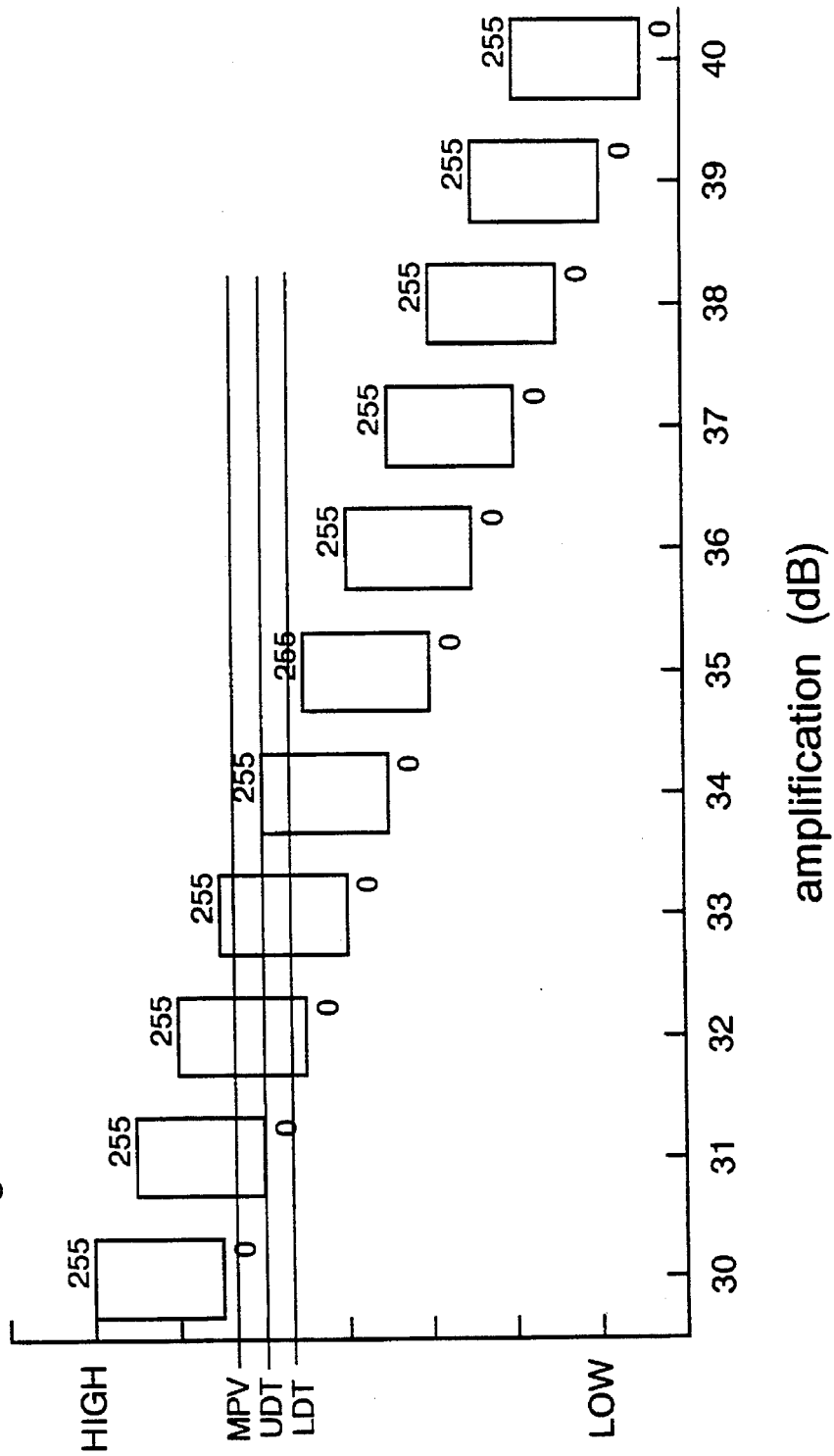
FIG. 4 is a graphical representation of the relationship between data range selection and amplification, illustrating the shifting 256-bit data range window.

Referring now to FIGS. 3 and 4, there is shown a flowchart illustrating the steps for autoranging of amplification as utilized by the present invention, and a graphical illustration of the data range selection utilized during autoranging of the amplification, respectively. In the preferred embodiment, either the emitted light or the received light can be amplified. Most preferably, the transmitting current of the LEDs is adjusted first during autoranging to a maximum value of 15 dB. If further amplification is required, the received light can then be amplified for example in about 10 dB increments. The transmitted light is adjusted first due to signal-to-noise ratio considerations, since amplification of the received light results in amplification of noise. The amplification circuitry is part of the I/V converter 18 shown in FIG. 1, and includes a two-stage inverting amplifier.

Referring now to FIG. 4, there is illustrated the relationship between data range and amplification. Considerable dynamic range is required by the apparatus to compensate for the effects of different windshield types, dirt, salt, different rain intensities, and the like. The sensor value provided to the microcontroller is monitored and the gain is accordingly adjusted so as to keep the data range at a readable level. As shown, lower amplification values are associated with high transmission windshields and higher amplification values are associated with low transmission windshields. Regardless of the moisture/dirt condition on the surface of the windshield, the data range is preferably represented by a 1-byte window (256 values) that shifts depending on the amplification value. The preferred amplification level is about 33 dB, wherein the associated window includes the maximum possible value (MPV) threshold, the upper dirt threshold (UDT) and the lower dirt threshold (LDT). The MPV represents the signal value associated with a clean and dry windshield. The UDT and LDT are functions of the amplification level and of the MPV for a clean windshield. The UDT is about 50–60 values below the MPV and the LDT is about 100–120 values below the MPV. In the preferred embodiment, during autoranging the gain is adjusted to an amplification level which includes all three thresholds. The normal amplification level is about 33 db, with the MPV having a window value of about 230, the UDT having a window value of about 180 and the LDT having a window value of about 130. Although the window values of the MPV, UDT and LDT vary based on amplification, they still represent the same moisture/dirt condition on the windshield. For example, the MPV is about 150 for an amplification of 32 dB, and 230 for an amplification of 33 dB, but the MPV still represents the sensor value for the driest and cleanest windshield.

At step 70 of FIG. 3, the microcontroller 12 determines whether or not the windshield wiper system is activated. The microcontroller makes this determination based on a signal from the wiper motor applied to the control input $W_A$.

Preferably, the wiper motor includes an internal switch which is actuated shortly after the motor is energized and the wiper blades leave the resting position. When the switch is actuated, the wiper-active voltage signal is provided to the microcontroller. While the wiper motor is deactivated, at step 72 the microcontroller determines whether the sensor value is below the lower threshold of measurement range (LTMR≈30 values) of the data window. If the sensor value is below the LTMR, the amplification is adjusted at step 74 by a predetermined increment, such as 1 dB. If the sensor value is above the LTMR, the microprocessor determines at step 76 whether the signal value has exceeded the upper threshold of measurement range (UTMR≈240 values) of the data window. If the sensor value has exceeded the UTMR, then at step 78 the amplification is adjusted by a predetermined decrement, such as 1 dB. After either a unit increment or a unit decrement at step 74 or 78, respectively, at step 80 the sensor signal out-of-range flag is set, forcing the windshield wipers to wipe the windshield, so as to clear the moisture. Every time a wiper blade passes over the sensor active area for the last time during the wipe, a new HPV is determined, as described in greater detail below.

With continuing reference to FIG. 3, if the wiper motor is activated (i.e. a wipe cycle is occurring) at step 70, control flow jumps to step 82, wherein the microcontroller determines whether or not the wipers are in the low, or resting, position. If the wipers are not in the low position, the signal value is observed at step 83 to determine if it is out of measurement range and how long it has been so. After that the autoranging procedure is exited, with control flow returning to block 54 of FIG. 2. If, however, the wiper motor has been activated and the wipers are again in the low position, the microcontroller checks the information from the last wiping cycle (step 83) and determines whether the sensor value was within the data window. More specifically, at step 84 the microcontroller determines whether the signal value was below the lower boundary (i.e. LB=1, sensor value=0) of the data window. If so, at step 86 the amplification is increased by an amount proportional to the total time during the wipe cycle that the sensor value was out of the data window. If not, at step 88 the microcontroller determines whether the sensor value had exceeded the upper boundary (i.e. UB=254, sensor value=255) of the data window and, if so, decreases the amplification at step 90 by an amount proportional to the total time during the wipe cycle that the sensor value was out of the data window.

As shown in FIG. 2, after autoranging of the amplification is complete, at step 54 the microcontroller performs a rain pattern recognition procedure. The magnitude of the sensor active area as compared to the total windshield area becomes significant when the rain is falling slowly and in a pattern of widely scattered drops. In this case, inference wipes of the wiper blades are made independent of the switch-on threshold, so as to assure consistent wiping intervals, as described in greater detail below.

Figure 5:
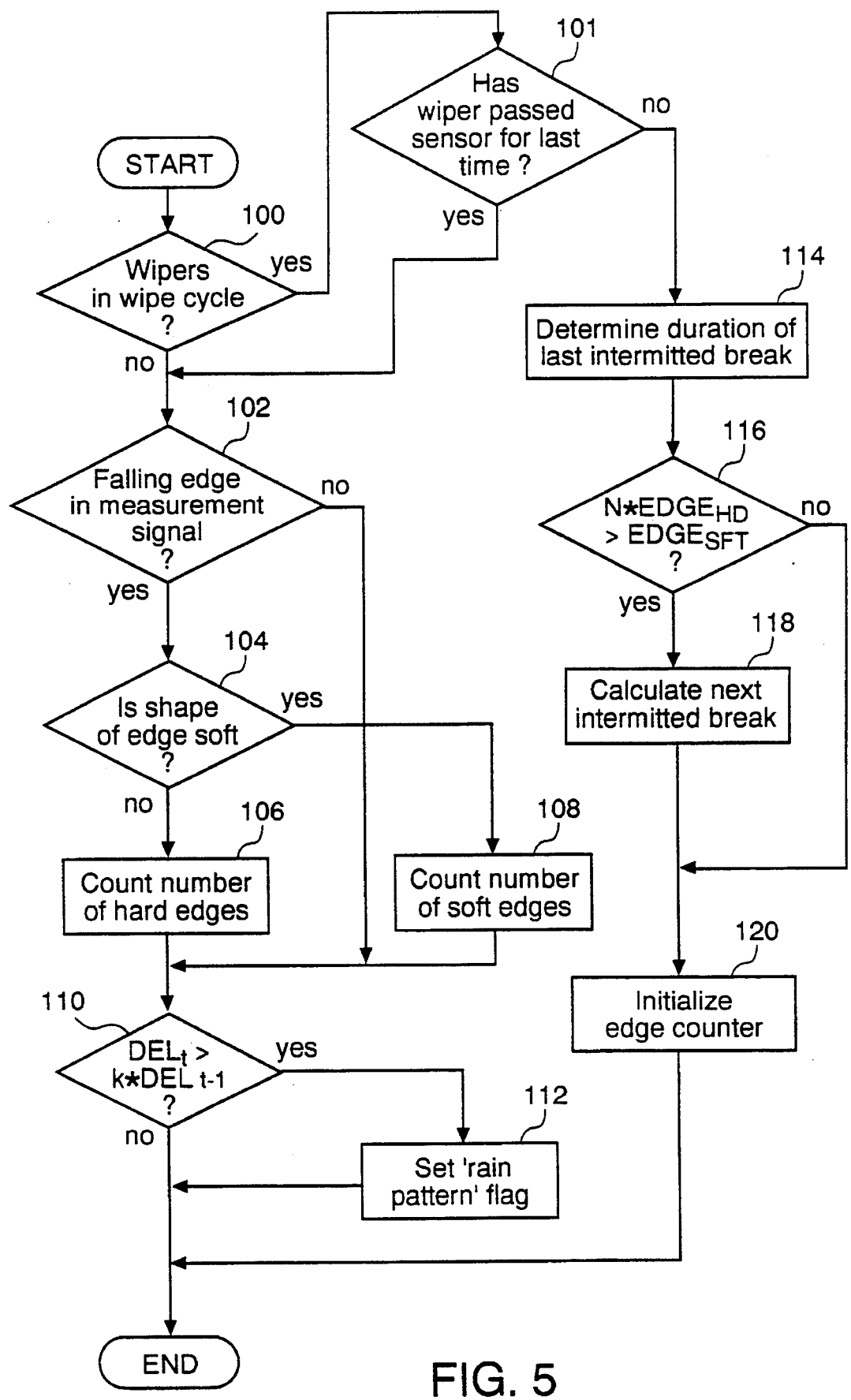
FIG. 5 is a flowchart detailing the single drop recognition step shown in FIG. 2.

Referring now to FIG. 5, there is shown a flowchart illustrating the steps of the method for recognition of a single rain drop pattern. FIGS. 6a–6b are graphical illustrations of the sensor value during single rain drop recognition and the wiper active signal representing activation of the wiping system, respectively. In the preferred embodiment, the wiping system is controlled according to the single rain drop recognition procedure only during operation of the wiping system in intermittent mode.

The sensor value varies, i.e. increases or decreases resulting in an "edge", as the moisture level on the sensor active area varies. Depending on the type of moisture, the shape of the sensor value edge is either "hard" or "soft". During the time delay between consecutive wipes, the microcontroller counts both types of edges. Generally, if the number of soft edges counted during a delay period does not overwhelmingly exceed the number of hard edges counted during the same period, a single drop rain pattern is recognized.

As shown in FIG. 5, at step 100 the microcontroller determines whether the wipers are currently in a wipe cycle wiping the windshield, or whether the wipers are in the resting position during an intermittent delay period. If the wiper is in a wiping cycle, the microcontroller checks at step 101 if the wiper blade has passed the sensor active area for the last time. If the wiping system is in an intermittent delay period, or if the wiper is on the way to the rest position, the microcontroller analyzes the sensor value at step 102 to determine the presence of a falling edge in the sensor value. If a falling edge is present, a rain drop has fallen on the sensor active area, and at step 104 the microcontroller determines the shape of the edge. With the preferred embodiment, a hard edge represents about a 4 digit decrease in the sensor value, and a soft edge represents about a 2–3 digit decrease in the sensor value, typical of drizzle-like rain patterns. A hard edge due to a rain drop is shown at point "A" on FIG. 6a.

Depending on the shape of the edge, the microcontroller counts the number of hard edges ($EDGE_{HD}$) or soft edges ($EDGE_{SFT}$) at steps 106 or 108, respectively. Thus, since the sensor value includes a single hard edge at point "A" of FIG. 6a, $EDGE_{HD}=1$ and $EDGE_{SFT}=0$. At step 110, the microcontroller compares the present intermittent delay period ($DEL_t$) with the previous delay period ($DEL_{t-1}$) as follows:

$$DEL_t > k * DEL_{t-1} \qquad (1)$$

wherein K is a constant, such as 1. During the first pass through the routine, the test fails since DELt and DELt−1 still have their initialized values of "0", and control flow returns to FIG. 2.

Since the falling edge at point "A" in FIG. 6a lowered the sensor value to a value below the switch-on threshold for the intermittent mode of operation $TIM_{OFF}$, the wiper motor is energized after expiration of the delay period, such as at time t=1 of FIG. 6b. The switch-on threshold for the intermittent mode is calculated from the HPV. As the wiper blades leave the resting position and wipe the windshield, water is pushed over the sensor active area, resulting in a first sharp decrease in the sensor signal, shown generally at point "B" on FIG. 6a. As the wiper blades return toward the resting position, water is once again pushed over the sensor active area, resulting in a second sharp decrease in the sensor signal, shown generally at point "C" on FIG. 6a. Once the wipers pass the active area on the return wipe, the sensor active area is substantially dry, resulting in a sharp increase in the sensor signal to a point above $TIM_{OFF}$. At point t=2 on FIG. 6b, the wiper motor is deenergized for a duration equivalent to the delay period.

With reference once again to FIG. 5, when the single drop procedure is executed again, control flow will skip to step 114, since the condition at step 100 will be satisfied since the motor will have been activated during intermittent operation and the wiper has not reached the sensor for the last time during the wipe cycle. At step 114, the microcontroller determines the duration of the previous delay period between the consecutive wipes of the windshield. At step

116, the microcontroller tests the following inequality, the results of which actually indicates the existence of a single rain drop pattern:

$$n * EDGE_{HD} > EDGE_{SFT} \qquad (2)$$

wherein for example n=4. If this condition is not satisfied, the next wipe cycle will be initialized when moisture is detected. At step 120, the microcontroller initializes the edge counters.

If the condition at step 116 is satisfied, at step 118 the microcontroller calculates a new delay period between consecutive wipes based on the old delay period. However, if detected moisture makes an earlier wipe appropriate, this is executed. As can be seen from FIGS. 6a and 6b, it should be noted that between times t=2 and t=3, the sensor value remained above $T_{ON}$, generally indicating no rain drops fell on the sensor active area. At step 110, as shown in FIG. 5, the current delay time is checked. If the delay time which is calculated in step 118 has expired, the rain pattern flag is set by the microcontroller at step 112 which initializes the wipe cycle. At time t=3 on FIG. 6b, the motor is once again energized by the microcontroller and the windshield is wiped. As the wiper blades leave the resting position and wipe the windshield, water is pushed over the sensor active area, resulting in a sharp decrease in the sensor signal, shown generally at point "D" on FIG. 6a. As the wiper blades return toward the resting position, water is once again pushed over the sensor active area, resulting in another sharp decrease in the sensor signal, shown generally at point "E" on FIG. 6a. After the sensor signal returns to a point above $TIM_{OFF}$ at point t=4 on FIG. 6b the wiper motor is deenergized and in the resting position.

Referring once again to FIG. 2, at step 56 the microprocessor also executes a sensitivity control procedure. In the preferred embodiment, when dirt, salt, and the like, are present on the windshield, the switch-on threshold and switch-off threshold are reduced, so as to delay activation of the windshield wiping system and allow moisture to collect on the windshield. With the extra moisture on the windshield, the wiper blades will have a more effective cleansing action and dirt streaks across the windshield will be reduced. Generally, dirt is detected by comparing the HPV to the upper dirt threshold and the lower dirt threshold. If the HPV falls below either of these thresholds, the sensitivity is reduced correspondingly.

Figure 7:
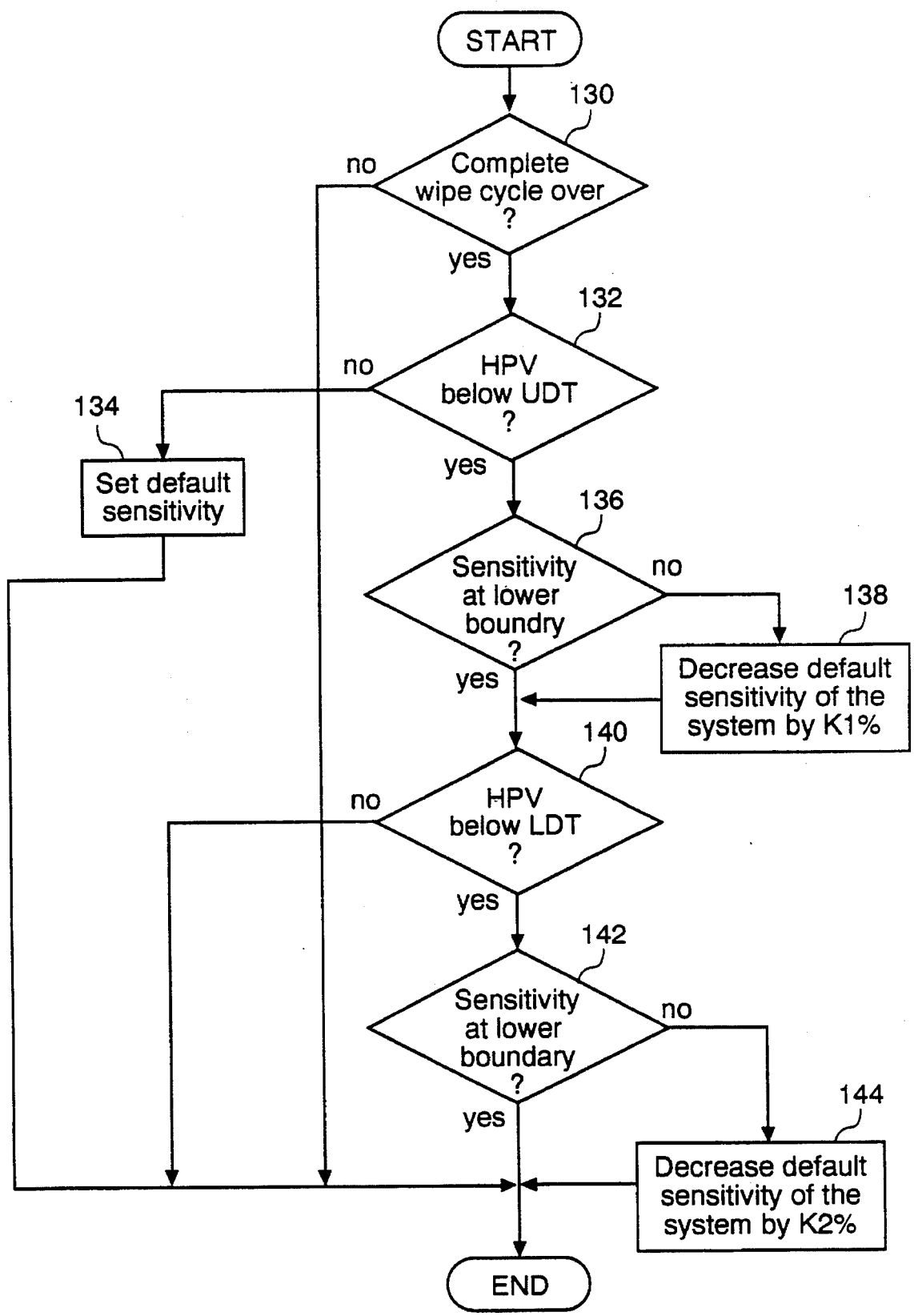
FIG. 7 is a flowchart detailing the sensitivity control step shown in FIG. 2.

With reference now to FIG. 7, there is shown a flowchart illustrating the steps for dirt streak dependent sensitivity control for use with the present invention. Initiation of the sensitivity control procedure is deferred until the wiping system is deactivated after completion of a wipe cycle, as determined at step 130. At step 132, the microcontroller detects the presence of dirt on the windshield by comparing the present HPV to the upper dirt threshold. This comparison takes place after the wiper has passed the sensor for the last time in a wipe cycle. If the HPV is above the UDT, at step 134 the microcontroller sets the sensitivity level to a predetermined default level and control flow returns to step 58 of FIG. 2. If the condition at step 132 is satisfied and the HPV is below the upper dirt threshold, the microcontroller determines whether or not the sensitivity of the sensor is at its lower boundary, since it is not desirable to further decrease the sensitivity further below the lower boundary. If not, the microcontroller decreases the default sensitivity level of the system by about K1% of the HPV, wherein K1=2, for example.

As shown in FIG. 7, if the sensitivity of the system is at the lower boundary, at step 140 the microcontroller determines whether the present HPV is below the lower dirt threshold (LDT). If the HPV is above the LDT, the sensitivity procedure is exited. If the HPV is below the LDT, at step 142 the microcontroller determines whether or not the system sensitivity is at the lower boundary. Depending on the result, the sensitivity may be decreased by about k2% of the HPV at step 144, wherein k2=5, for example.

As shown in FIG. 2, in addition to performing the sensitivity control procedure at step 56, the microcontroller executes a start wiper procedure at step 58. Generally, when the moisture ratio measurement value falls below the switch-on threshold, the windshield wipers are activated. With additional reference to FIG. 8, there is shown a flowchart detailing the steps for determining whether or not to activate the windshield wipers from the low, or resting, position. At step 150, the microcontroller makes a moisture ratio measurement value. As previously discussed, the moisture ratio measurement value is calculated from the current sensor value and the last determined HPV. At step 152, a comparison is performed by the microcontroller to determine whether the moisture ratio is below the predetermined noise level (e.g. 98%) prior to updating the value of the switch on threshold at step 156 according to the following equation:

$$T_{ON} = T_{DEF} + K* \int_{T_s}^{t} (N - MRV) dt \qquad (3)$$

wherein N represents a predetermined noise level and $T_{DEF}$ represents a default switch on threshold. Equation (3) represents an integration over time proportional to the quantity of moisture present.

Figure 8:
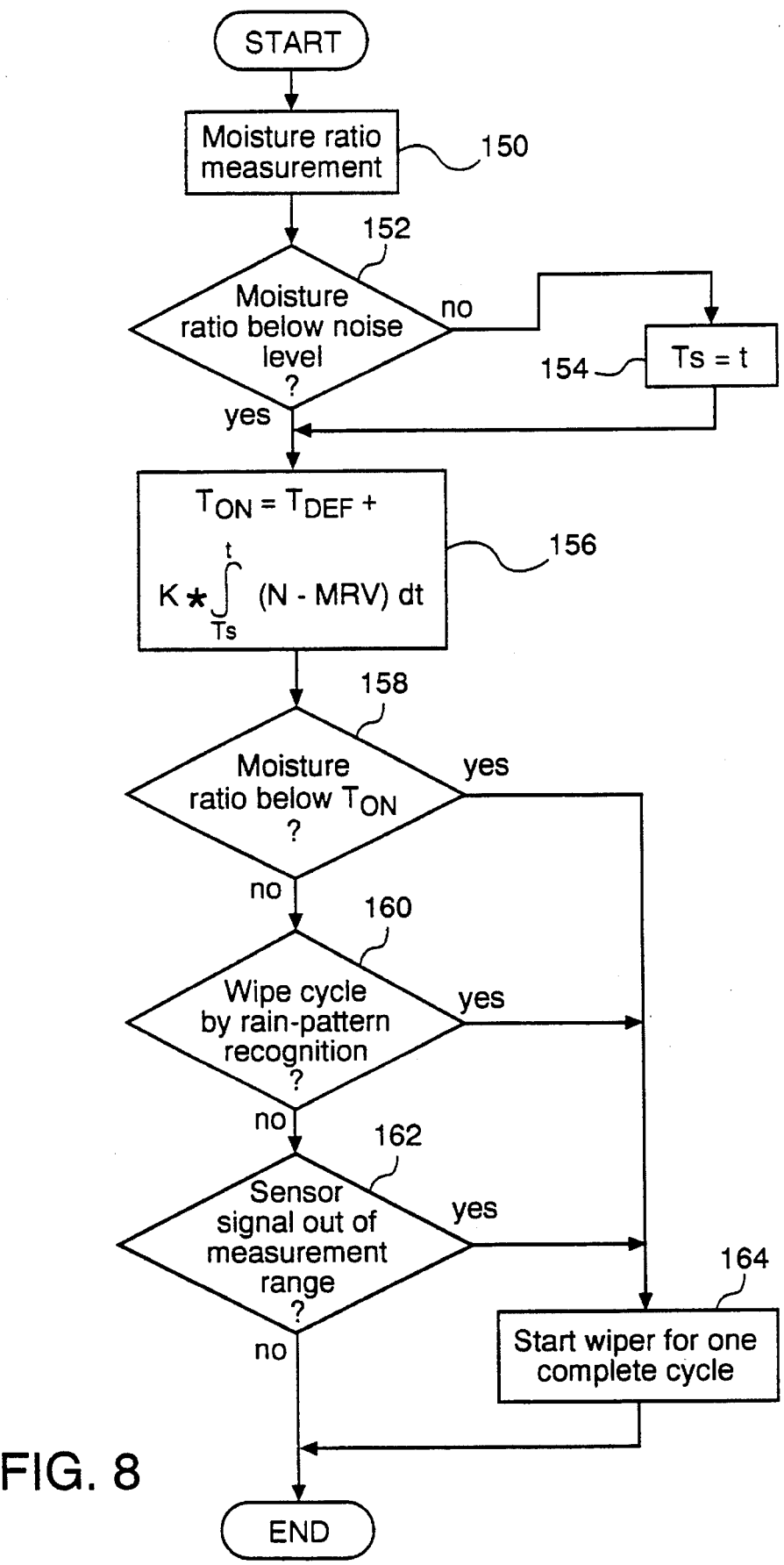
FIG. 8 is a flowchart detailing the start wiper step shown in FIG. 2.

As shown in FIG. 8, if the moisture ratio is not below the predetermined noise level, the switch on threshold does not need to be adjusted from the default value. As a result, at step 154, the variable Ts, which represents the time at which the MRV dropped below the noise level, is set to the value of t, which represents the current time, such that the integral term of equation (3) above is equal to zero and the switch-on threshold remains at the default level, $T_{ON} = T_{DEF}$. If, however, the moisture ratio is below the noise level, indicating the presence of moisture, the switch-on threshold is adjusted.

With continuing reference to FIG. 8, at step 158 the microcontroller determines whether the moisture ratio is below the adjusted switch-on threshold determined at step 156. Assuming the moisture remains on the sensor active area, the switch-on threshold will eventually exceed the MRV. When it does, control flow jumps to step 164, and the windshield wipers are activated for one complete cycle. If the moisture ratio is not below the adjusted switch-on threshold, at step 160 the microcontroller determines whether a wipe cycle should be initiated based on a single drop rain pattern, previously discussed with reference to FIGS. 5 and 6. If the observed rain pattern indicates a wipe cycle is necessary at step 160, control flow jumps to step 164 and the wipers are activated. If not, the sensor signal is analyzed at step 162 to see if it is out of measurement range (i.e. 0 or 255). If the sensor signal is out of measurement range, the wipers are activated for one complete cycle at step 164, which in turn triggers determination of a new HPV and accordingly new thresholds. If the sensor signal level is acceptable, control flow returns to step 60 of FIG. 2.

Referring once again to FIG. 2, if the windshield wipers are activated as determined at step 60, at step 62 the microcontroller determines the new HPV. As previously discussed, the HPV reflects the maximum sensor value for a dry, or clean, windshield. In the preferred embodiment, the HPV is measured after the wiper blades pass over the sensor active area for the last time during a wipe cycle. It is at this time that the area of the windshield monitored by the sensor is the driest, or the cleanest, for the existing rain/dirt condition. Thus, a dry and clean windshield may have a maximum sensor value of 200, whereas a dry and dirty windshield may have a maximum sensor value of only 150. If the HPV is not periodically adjusted, the switch-on and switch-off thresholds, which are derived from the HPV, would prevent proper operation. For example, assume the switch-on threshold is set at a value of 95% of the HPV. For an HPV of 200, the switch on threshold is 190. However, the maximum sensor value for a dry and dirty windshield may be only 150. Since the sensor value would be always below the switch-on threshold, continuous wiping would result. Periodic determination of HPV allows the microcontroller to accurately ascertain at which sensor values the wiper motor should be energized.

Figure 9:
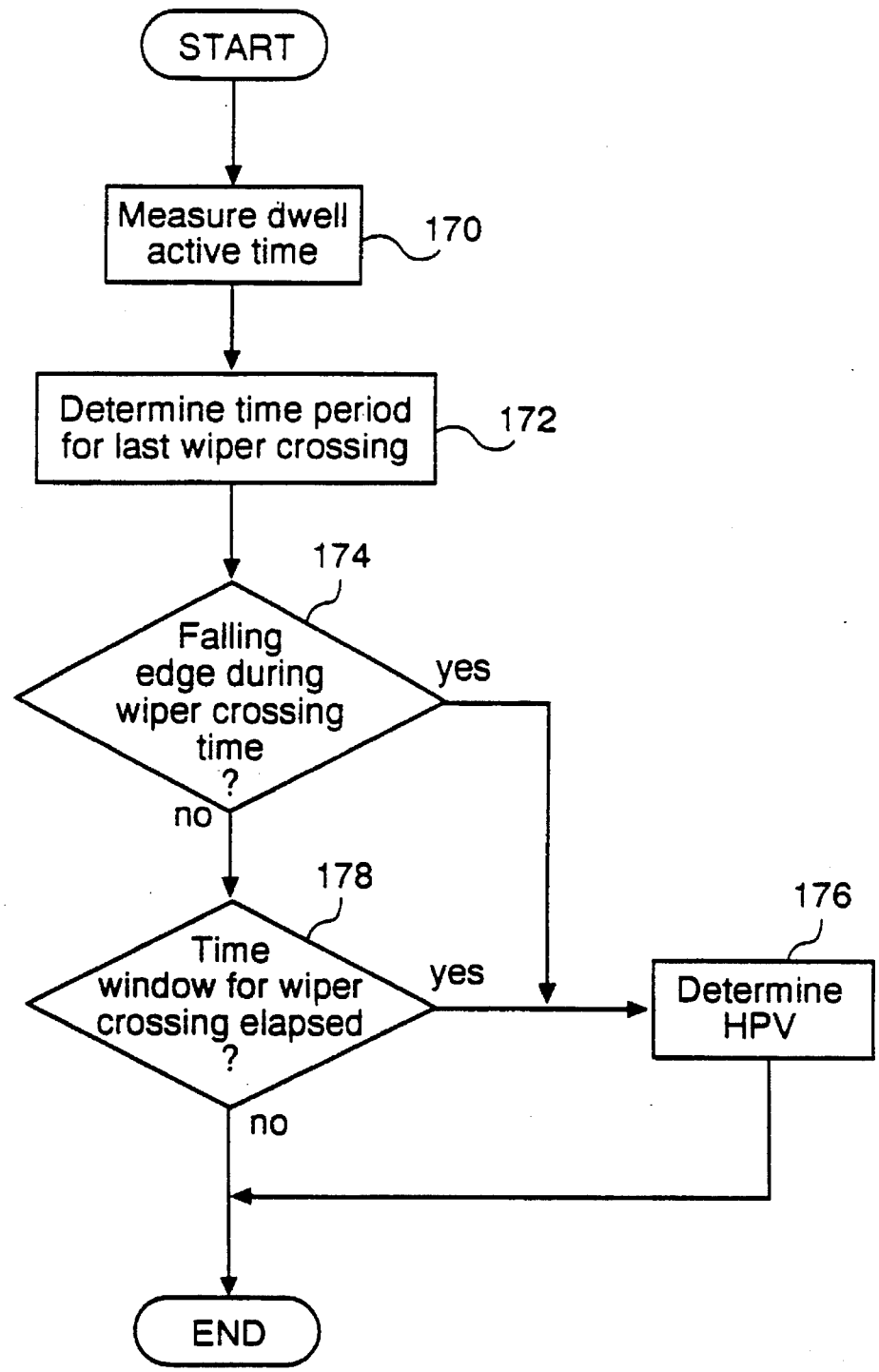
FIG. 9 is a flowchart detailing the determined hundred percent value (HPV) step shown in FIG. 2.
Figures 10A, 10B:
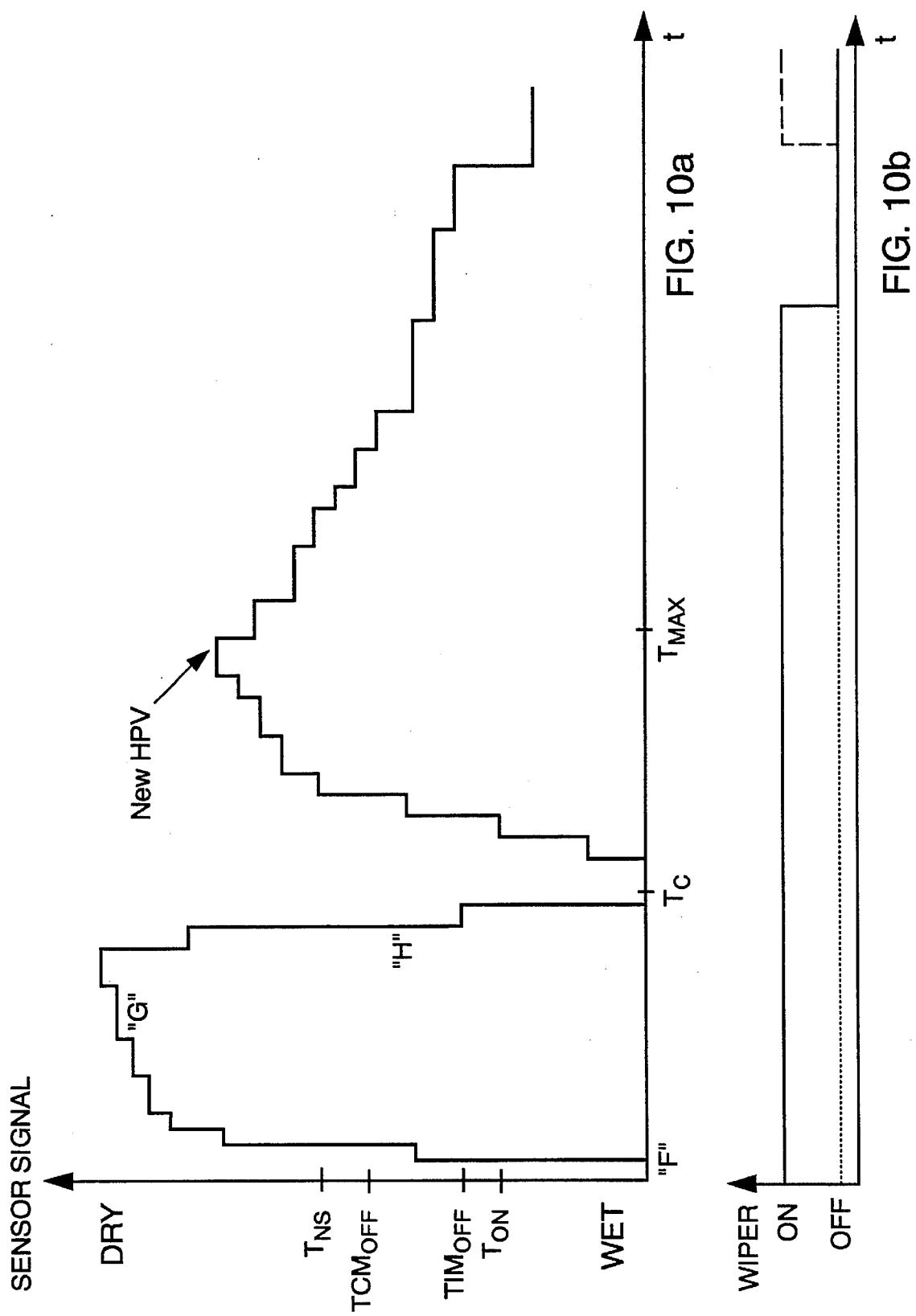
FIGS. 10a–10b are a graphical representation of the sensor signal trace during determination of the HPV, and the associated wiper activation signal, respectively.

Referring now to FIG. 9, there is shown a flowchart detailing the steps for determination of the HPV. FIGS. 10a and 10b are graphical illustrations of the typical sensor signal during determination of the HPV and the wiper activation signal, respectively. As shown in FIG. 9, at step 170 the microcontroller measures the dwell active time, which represents the duration of one complete wipe cycle, i.e. two passes of a wiper blade over the sensor active area. This time can vary due to the amount of water or dirt on the windshield, the battery voltage, vehicle speed and also due to aging of the wiper blades, the wiper motor and the like. The sensor signal trace of FIG. 10a is shown for a majority of a complete wipe cycle. Point "F" represents the point in time just after a wiper blade has pushed water over the active area and passed over the sensor active area. At this point, the sensor active area is dry, resulting in a sharp increase in the sensor signal to about point "G".

With continuing reference to FIGS. 9 and 10a–10b, at step 172 the microcontroller determines the time at which the wiper blades should have crossed the sensor active area for the last time during a wipe cycle, i.e. on the return wipe toward the resting position. This time is shown at about time $t=T_c$ on FIG. 10a. This determination is possible since the microcontroller knows when the motor was energized and knows the duration of the last complete wipe cycle (run time of the wiper active signal). When $T_c$ is determined, the microprocessor expands that time to a time window having a lower band at about time $t=T_c-30$ mS and an upper band at about time $t=T_c+30$ mS. At step 174, the microcontroller analyzes the sensor signal for the presence of a sharp decrease during that time window. This sharp decrease, such as that shown at point "H" on FIG. 10a, indicates water being pushed over the sensor active area by the wiper blades on their return to the resting position.

If a sharp decrease was detected, at step 176 the microprocessor searches for a new HPV. To determine the new HPV, the microcontroller monitors the sensor value after detection of the sharp decrease for a new maximum value. As best shown in FIG. 10a, the sensor value increases sharply after the wiper blades pass over the sensor active area and attains a maximum value at about time $t=T_{MAX}$. The sensor value thereafter decreases due to, for example, the presence of more rain on the sensor active area.

As shown in FIG. 10a, the sensor value will continue to decrease as the amount of moisture or dirt on the windshield increases. The wiper motor is deenergized based on the sensor value and the appropriate threshold. Thus, when the windshield wiping system is operating in continuous mode (i.e. two consecutive wipe cycles in a row), the wiper system will continue to function in the continuous mode as long as the sensor signal drops below $TCM_{OFF}$, which has a value of about 97% of HPV, for example. If the sensor value remains above $TCM_{OFF}$, the wiper motor will be deenergized. This wiping strategy helps to minimize erratic wiper behavior, since the windshield condition has to be rather dry for the sensor value to exceed the higher threshold. Similarly, when the windshield wiping system is operating in intermittent mode, the wiper system will continue to function in the intermittent mode as long as the sensor signal drops below $TIM_{OFF}$, which has a value of about 95% of HPV, for example. If the sensor value remains above $TIM_{OFF}$, the wiper motor will be deenergized since the system is not operating in continuous mode, such as at time $t=t_{OFF}$ on FIG. 10b. The wiper motor will not be energized again until the sensor value drops below the $T_{ON}$ threshold due to moisture on the active area, such as at time $t=t_{ON}$. If no falling edge was detected at step 174, and the time window during which the wipers should have crossed the active area expires, at step 178 control flow returns to step 176 and a new HPV is determined, as previously discussed.

As shown in FIG. 2, once the new HPV is determined at step 62, the microprocessor executes a stop wiper procedure to determine whether or not to deactivate the windshield wiping system. Generally, when the moisture ratio is above the switch-off threshold after a complete wipe cycle, the wipers are deactivated.

Figure 11:
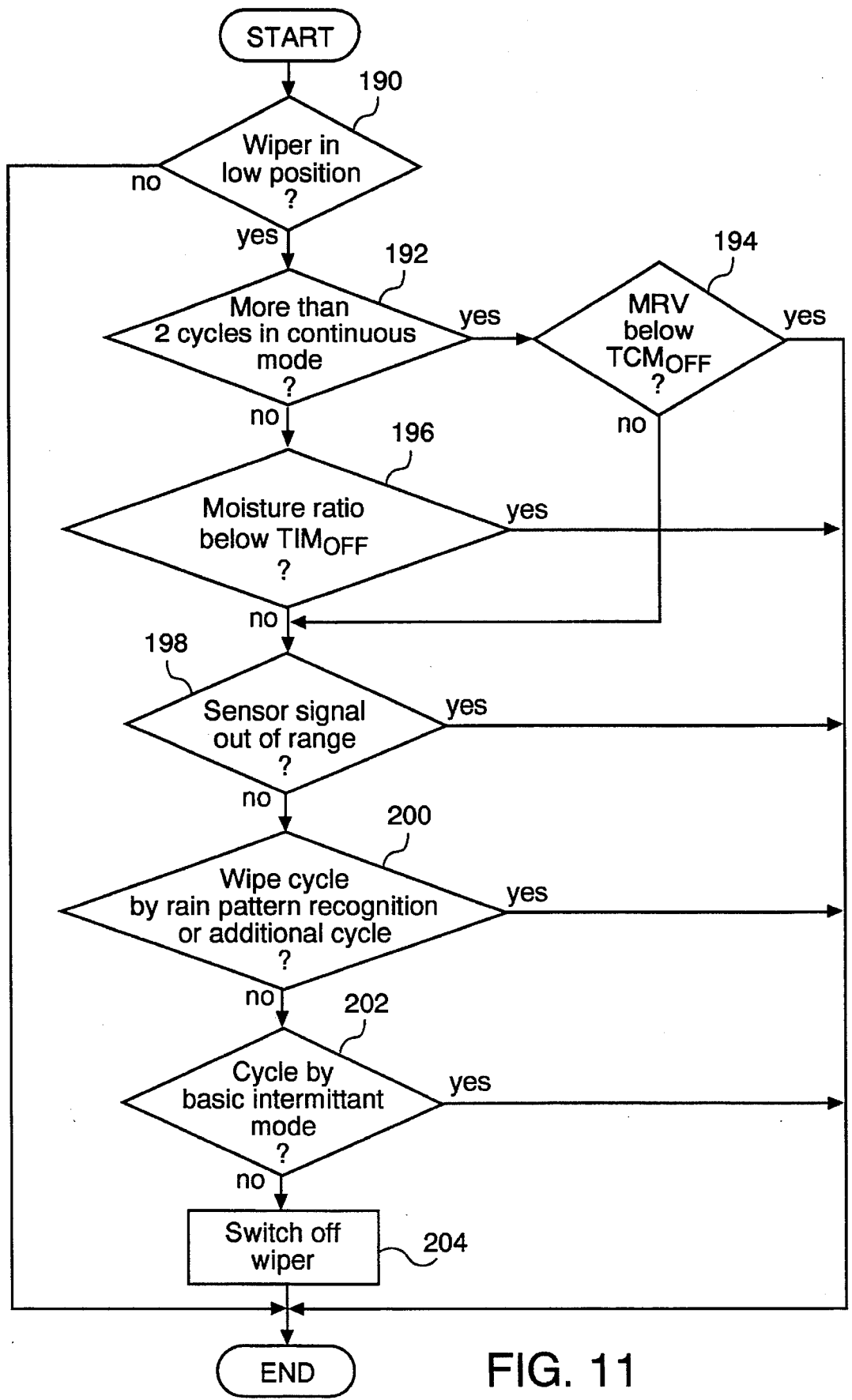
FIG. 11 is a flowchart detailing the stop wiper step shown in FIG. 2.

Referring now to FIG. 11, there is shown a flowchart detailing the steps for determining whether to stop the wiper in the low position. When the windshield wiping system is in the low position as determined at step 190, the microcontroller determines at step 192 whether the windshield wiping system has been activated for more than two cycles in the continuous mode. If the condition is satisfied, at step 194 the microcontroller compares the moisture ratio measurement value (MRV) to the continuous mode switch- off threshold ($TCM_{OFF}$). If the MRV is below $TCM_{OFF}$, the stop wiper procedure is exited and control flow returns to the main loop shown in FIG. 2 wherein steps 52–62 are repeated as described in greater detail above. Independently of the switch-on threshold, the switch-off threshold increases when the wiper is operating in continuous mode e.g. $TIM_{OFF}=$ 96% * HPV and $TCM_{OFF}=97\%$ * HPV. For moisture ratio values above the switch-off threshold, control flow jumps to step 198, described in greater detail below.

With continuing reference to FIG. 10, if the condition tested at step 192 was not satisfied, at step 196 the microcontroller determines whether the moisture ratio value is below the intermittent mode switch-off threshold ($TIM_{OFF}$). At steps 198, 200 and 202, the microprocessor analyzes the sensor signal for out-of-range values, determines whether the current rain pattern requires continued activation of the wiper system and determines whether the wiper should be cycled according to the basic intermittent mode, respectively. If any of these conditions are satisfied, the stop wiper procedure is exited and control flow returns to the main loop of FIG. 2, wherein steps 52–62 are repeated as described above. If these conditions are not satisfied, the microcontroller deactivates the wiper system at step 204 and control flow is returned to the main loop as shown in FIG. 2.

At any time during operation of the windshield wiper system, a determination is made as to whether or not a particular mode of wiper operation should be entered. More particularly, according to the present invention, a determination is made by the microcontroller 12 as to whether or not a high speed mode of operation should be entered. The high speed mode of operation is a continuous mode of operation in that there is no delay between consecutive wipe cycles, but is different from the continuous mode described above in that the speed or frequency of wiping is increased, for example, twofold.

Figure 12A:
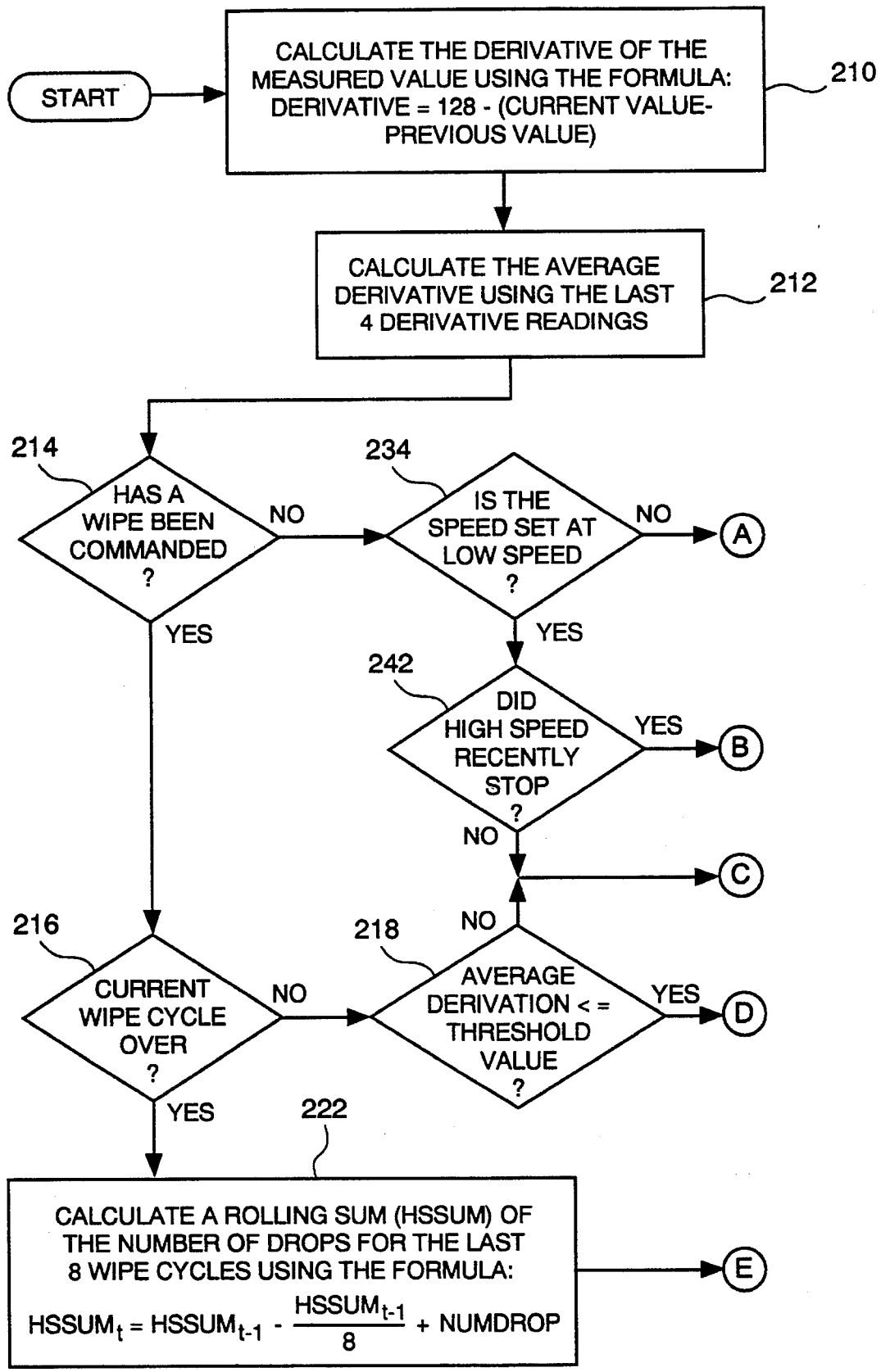
FIGS. 12a, 12b, 12c are a flowchart detailing determination of high speed wiping according to the present invention.
Figure 12B:
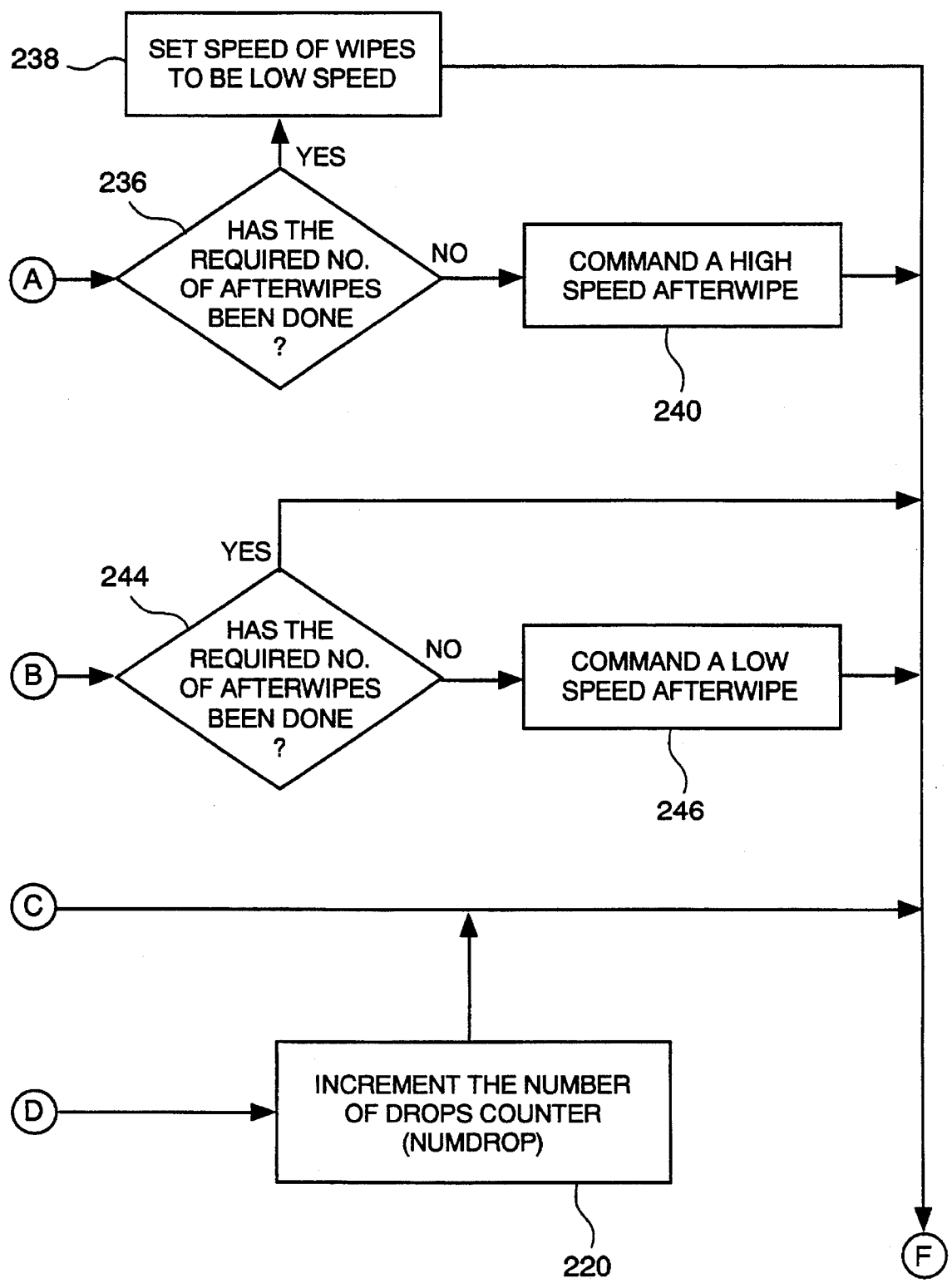
Figure 12C:
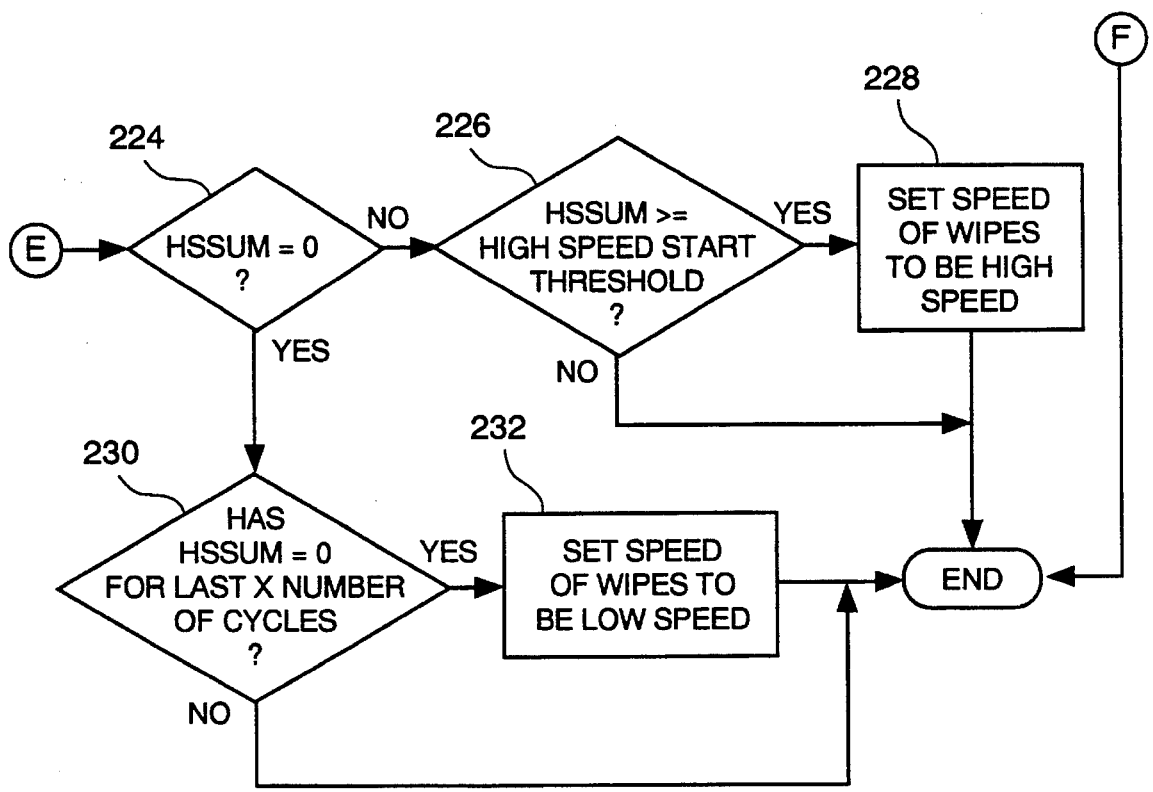

Referring now to FIG. 12, there is shown a flowchart for determining high speed operation according to the present invention. As shown, at step 210 the microcontroller determines the derivative or instantaneous change of the sensor signal value, preferably about every 10 mS except for about a 120 mS window for each overwipe. In the preferred embodiment, the derivative $S_D$ is determined as follows:

$$S_D = 128 - (S_t - S_{t-1}) \qquad (4)$$

wherein $S_t$ is the current sensor signal value and $S_{t-1}$ is the previous sensor signal value. At step 212, an average derivative $S_{Dav}$ is determined based on the four previous derivatives.

With continuing reference to FIG. 12, if a wipe has been commanded, as determined at step 214, control flow proceeds to step 216, wherein the microcontroller determines whether the current wipe cycle has been completed. During each wipe cycle, if the average derivative is less than or equal to a predetermined derivative threshold (step 218), a number of raindrops counter (NUMDROP) is incremented (step 220). Thus, the counter represents the number of times the average derivative ($S_{Dav}$) is below or equal to the derivative threshold ($D_{TH}$).

At the completion of each wipe cycle (step 216), a rolling sum of the number of drops for the last eight (8) wipe cycles is determined and stored in the variable HSSUM (step 222). In the preferred embodiment, HSSUM is determined as follows:

$$HSSUM_t = HSSUM_{t-1} - \frac{HSSUM_{t-1}}{8} + NUMDROP \qquad (5)$$

Thus, the value of HSSUM is dependent on the value of NUMDROP.

Figure 13A:
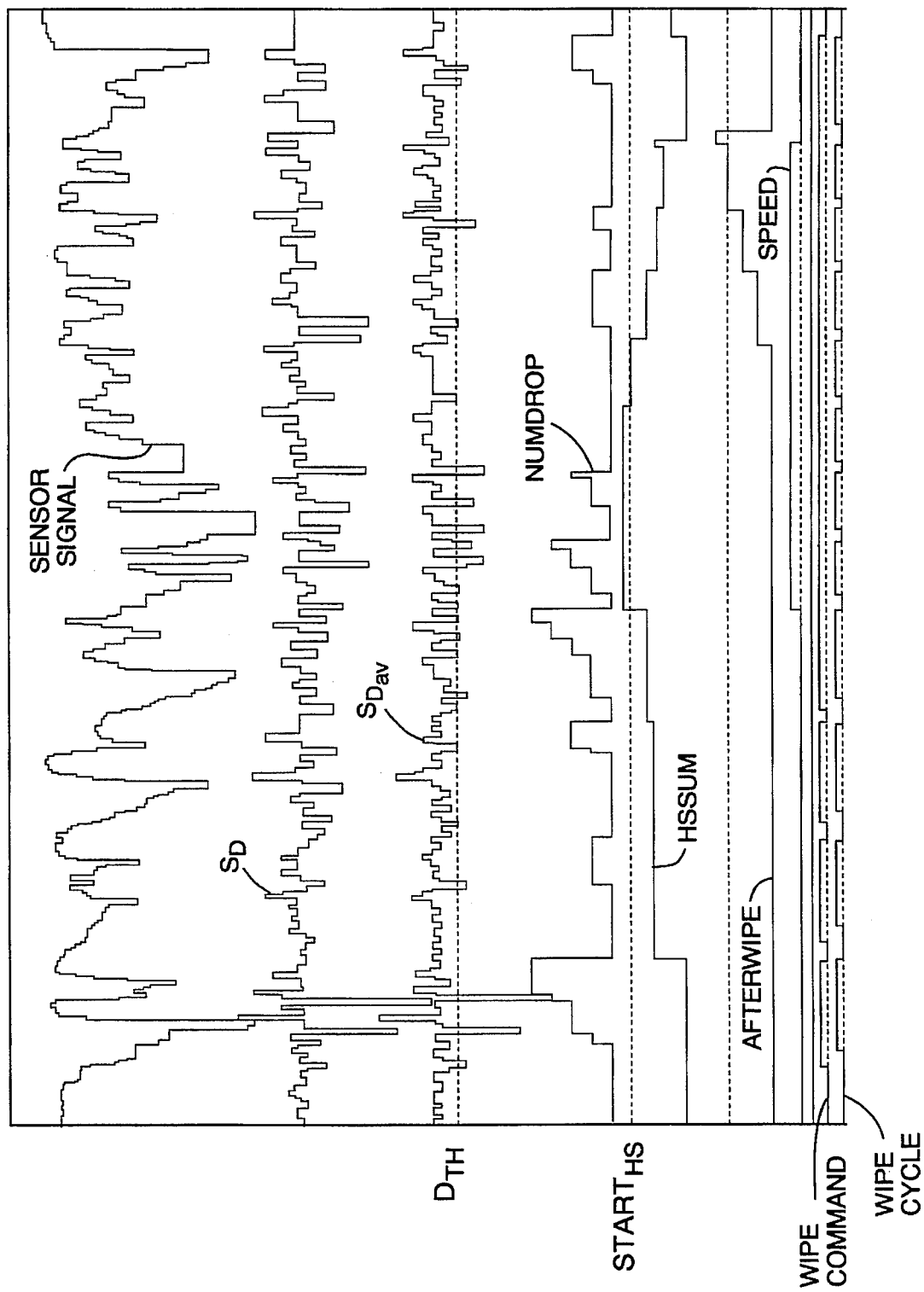
FIGS. 13a–13b are graphical illustrations of various signals for determining high speed wiping according to the present invention for numerous wipe cycles and for a single wipe cycle, respectively.
Figure 13B:
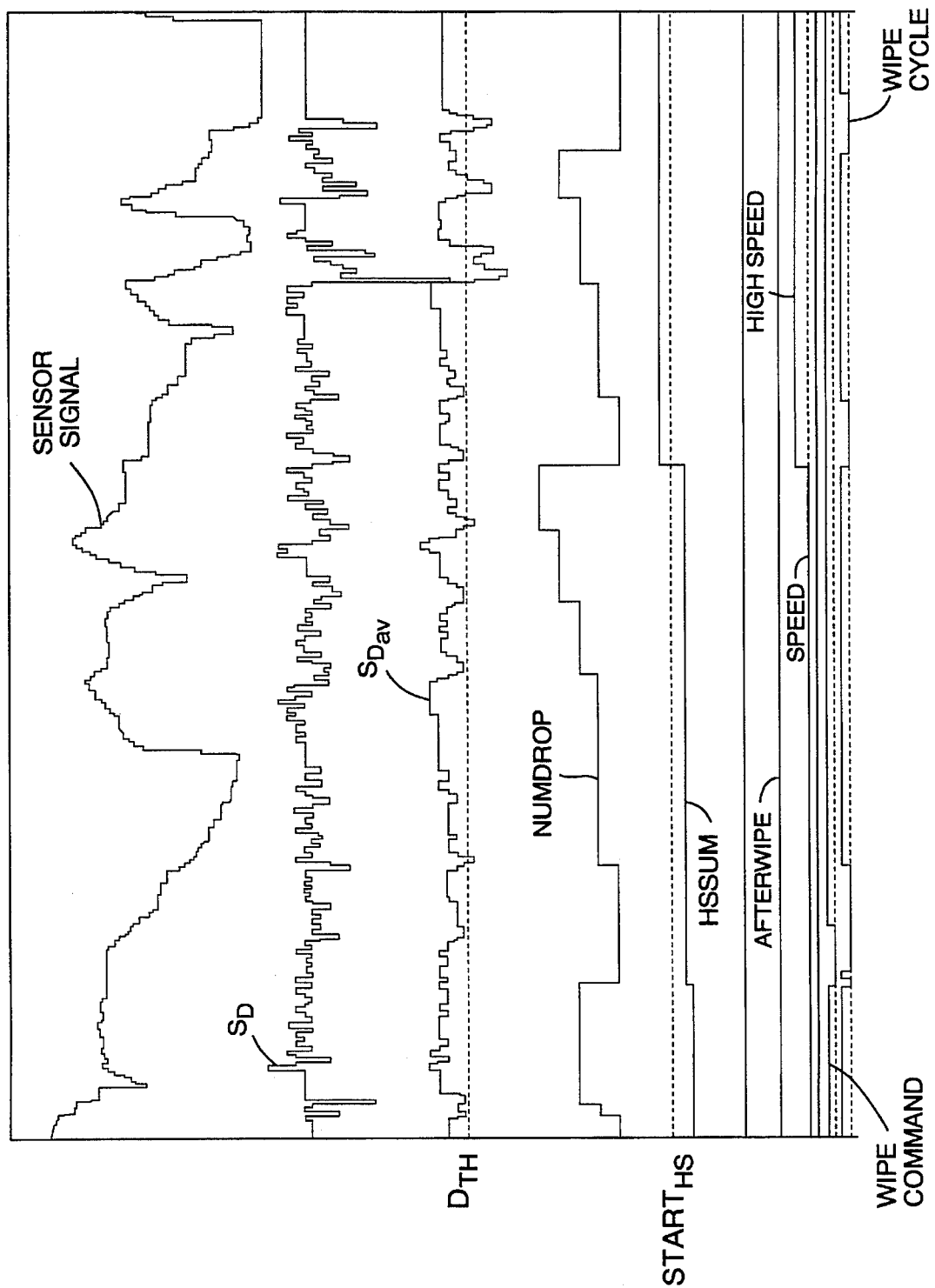

With additional reference to FIGS. 13a–13b, there are shown graphical illustrations of the relationship between various signals for numerous wipe cycles and for a single wipe cycle, respectively. Depicted (from top to bottom) are the sensor signal, the derivative ($S_D$) of the sensor signal, the average derivative ($S_{Dav}$) Of the sensor signal, NUMDROP, HSSUM, afterwipe, wiper system speed, wipe command and wipe cycle.

If, during each wipe cycle, the average derivative remains above the derivative threshold, NUMDROP is not incremented and the value of HSSUM decreases. As long as HSSUM remains positive (step 224), HSSUM is compared to START$_{HS}$, a high speed start threshold (step 226). Based on that comparison, the wiper system may be set to operate in high speed wiping mode at step 228 (see point A of FIG. 13a).

Once initiated by the microcontroller, high speed wiping will continue until one of two conditions occur. If HSSUM=0 for a set number of cycles, such as 5 cycles, (step 230), high speed operation ceases and a set number of low speed afterwipes occur, such as 2 afterwipes, (step 232). Thereafter, normal rain sensor operation, as described in great detail above, resumes.

High speed wiping may also cease if some legitimate reason exists not to wipe (step 214). If a wipe has not been commanded, at step 234 the microcontroller determines whether the wiper system is set to operate in the low speed. If the system is not set to operate in low speed, the microcontroller determines whether a required number of afterwipes have been completed at step 236. In the preferred embodiment, any number from 2–5 afterwipes occurs depending upon the user-selected sensitivty level to satisfy step 236. Once this condition is satisfied at step 236, the microcontroller sets the speed of the wipes to be low (step 238).

If the system is set to operate in low speed as determined at step 234, and high speed operation has recently (e.g. last wipe cycle) ceased (step 242), low speed wiping continues for a set number of afterwipes (e.g. 2–5 afterwipes). Upon completion of each low speed afterwipe, if enough moisture exists to satisfy the high speed criteria (HSSUM≧START$_{HS}$, checked in step 226), high speed mode will be reentered. Otherwise, after the low speed afterwipes have occurred (determined in step 244), low speed mode of operation will stop. Thereafter, normal rain sensor operation, as described in greater detail above, resumes.

It is to be understood, of course, that while the form of the invention described above constitutes the preferred embodiment of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. A method of controlling a vehicular windshield wiping system, the wiping system including at least one wiper blade, a motor for driving the at least one wiper blade at a high speed and a low speed, and a sensor mounted to the windshield for monitoring a portion of the windshield wiped by the at least one wiper blade, the sensor generating a sensor signal having a value indicative of the moisture on the portion of the windshield, the system also including an electronic control unit for controlling the motor based on the sensor signal, the method comprising the steps of:

determining an average rate of change in the sensor signal value over a predetermined period of time;

operating the wiper system with the motor at the high speed based on the average rate of change in the sensor signal value;

determining a rolling sum of the number of times the average rate of change drops below a first threshold over a second predetermined period of time;

comparing the rolling sum to a second predetermined threshold; and operating the wiper system with the motor at the high speed based on the comparison.

2. The method of claim 1 wherein the wiper system is operated with the motor at the high speed when the rolling sum has a value which is at least equal to the second predetermined threshold.

3. The method of claim 2 wherein the rolling sum (HSSUM) is determined according to the following:

$$HSSUM_t = HSSUM_{t-1} - \frac{HSSUM_{t-1}}{8} + NUMDROP;$$

wherein NUMDROP represents the number of times the average rate of change in the sensor signal value drops below the first threshold.

4. The method of claim 3 further comprising operating the wiping system with the motor at the low speed when the rolling sum has a zero value for a predetermined period.

5. A method of controlling a vehicular windshield wiping system, the wiping system including at least one wiper blade, a motor for driving the at least one wiper blade at a high speed and a low speed, and a sensor mounted to the windshield for monitoring a portion of the windshield wiped by the at least one wiper blade, the sensor generating a sensor signal having a value indicative of the moisture on the portion of the windshield, the system also including an electronic control unit for controlling the motor based on the sensor signal, the method comprising the steps of:

determining an average rate of change in the sensor signal value over a first predetermined period of time;

determining a rolling sum of the number of times the average rate of change drops below a first threshold over a second predetermined period of time; and operating the wiper system with the motor at the high speed based on the rolling sum.

6. The method of claim 5 further comprising:

comparing the rolling sum to a second predetermined threshold; and operating the wiper system with the motor at the high speed based on the comparison.

7. The method of claim 6 wherein the wiper system is operated with the motor at the high speed when the rolling sum has a value which is at least equal to the second predetermined threshold.

8. The method of claim 7 wherein the rolling sum (HSSUM) is determined according to the following:

$$HSSUM_t = HSSUM_{t-1} - \frac{HSSUM_{t-1}}{8} + NUMDROP;$$

wherein NUMDROP represents the number of times the average rate of change in the sensor signal value drops below the first threshold.

9. The method of claim 8 further comprising operating the wiping system with the motor at the low speed when the rolling sum has a zero value for a predetermined period.

10. A control system for controlling a vehicular windshield wiping system, the wiping system including at least one wiper blade, a motor for driving the at least one wiper blade at a high speed and a low speed, the control system including a sensor mounted to the windshield for monitoring a portion of the windshield wiped by the at least one wiper blade, the sensor generating a sensor signal having a value indicative of the moisture on the portion of the windshield, the control system further comprising:

means for determining an average rate of change in the sensor signal value over a first predetermined period of time; and means for determining a rolling sum of the number of times the average rate of change drops below a first threshold over a second predetermined period of time, the control system operating the wiper system with the motor at the high speed based on the rolling sum.

11. The system of claim 10 further comprising:

means for comparing the rolling sum to a second predetermined threshold, the control system operating the wiper system with the motor at the high speed based on the comparison.

12. The system of claim 11 wherein the wiper system is operated with the motor at the high speed when the rolling sum has a value which is at least equal to the second predetermined threshold.

13. The system of claim 12 wherein the means for determining a rolling sum (HSSUM) determines the rolling sum according to the following:

$$HSSUM_t = HSSUM_{t-1} - \frac{HSSUM_{t-1}}{8} + NUMDROP;$$

wherein NUMDROP represents the number of times the average rate of change in the sensor signal value drops below the first threshold.

14. The system of claim 13 further comprising means for operating the wiping system with the motor at the low speed when the rolling sum has a zero value for a predetermined period.

* * * * *